US008454738B2

(12) United States Patent
Kaneumi et al.

(10) Patent No.: US 8,454,738 B2
(45) Date of Patent: *Jun. 4, 2013

(54) MOLD-RELEASING AGENT

(75) Inventors: Yoshiyama Kaneumi, Ibaraki (JP);
Seiichiro Murata, Ibaraki (JP);
Katsuyuki Sato, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/376,335

(22) PCT Filed: Jun. 3, 2010

(86) PCT No.: PCT/JP2010/059431
§ 371 (c)(1),
(2), (4) Date: Dec. 5, 2011

(87) PCT Pub. No.: WO2010/140652
PCT Pub. Date: Dec. 9, 2010

(65) Prior Publication Data
US 2012/0077930 A1    Mar. 29, 2012

(30) Foreign Application Priority Data
Jun. 5, 2009  (JP) .................................. 2009-135658

(51) Int. Cl.
B29C 33/62 (2006.01)
B28B 7/36 (2006.01)
B28B 7/38 (2006.01)
C09K 3/00 (2006.01)

(52) U.S. Cl.
USPC ........ 106/38.22; 106/2; 106/38.2; 525/326.2; 525/529; 570/126; 570/136; 570/138; 570/142

(58) Field of Classification Search
USPC   106/2, 38.2, 38.22; 525/326.2, 529; 570/126, 570/136, 138, 142
See application file for complete search history.

(56) References Cited

U.S. PATENT DOCUMENTS
8,197,586 B2 * 6/2012 Kaneumi et al. ........... 106/38.22

FOREIGN PATENT DOCUMENTS

| JP | 52-036588 | 3/1977 |
|---|---|---|
| JP | 52-039587 | 3/1977 |
| JP | 55-133490 | 10/1980 |
| JP | 58-180597 | 10/1983 |
| JP | 59-166596 | 9/1984 |
| JP | 60-190309 | 9/1985 |
| JP | 60-193615 | 10/1985 |
| WO | WO 95/00307 | 1/1995 |
| WO | WO 03-102003 A1 | 12/2003 |
| WO | WO 2007/105633 A1 | 9/2007 |

OTHER PUBLICATIONS

International Search Report from corresponding PCT application No. PCT/JP2010/059431 dated Aug. 3, 2010 (4 pgs).
International Preliminary Report on Patentability and Written Opinion from corresponding PCT application No. PCT/JP2010/059431 dated Jan. 26, 2012 (5 pgs).

* cited by examiner

*Primary Examiner* — Anthony J Green
(74) *Attorney, Agent, or Firm* — Brinks Hofer Gilson & Lione

(57) ABSTRACT

Disclosed is a mold-releasing agent comprising, as active ingredients, a graft copolymer (A) in which a polyalkylene glycol or an alkyl ether thereof is graft-copolymerized with a polyfluoro-1-alkene represented by the general formula: $C_nF_{2n+1}(CH_2CF_2)_a(CF_2CF_2)_bCH=CH_2$ (wherein n is an integer of 1 to 6, a is an integer of 1 to 4, and b is an integer of 1 to 3), and a polyfluoroalkylphosphonic acid represented by the general formula: $C_nF_{2n+1}(CH_2CF_2)_a(CF_2CF_2)_b(CH_2CH_2)_cP(O)(OH)_2$ (wherein n is an integer of 1 to 6, a is an integer of 1 to 4, and b is an integer of 1 to 3, and c is an integer of 1 to 3) or a salt thereof (B). The mold-releasing agent comprises, as an active ingredient, a compound having a perfluoroalkyl group containing 6 or less carbon atoms, which is said to have low bioaccumulation potential, and having mold release performance equivalent to or more than that of a mold-releasing agent comprising a compound having a perfluoroalkyl group containing 8 or more carbon atoms as an active ingredient.

9 Claims, No Drawings

MOLD-RELEASING AGENT

RELATED APPLICATION

This application is a 35 U.S.C. §371 national phase filing of International Patent Application No. PCT/JP2010/059431, filed Jun. 3, 2010, through which and to which priority is claimed under 35 U.S.C. §119 to Japanese Patent Application No. 2009-135658, filed Jun. 5, 2009.

TECHNICAL FIELD

The present invention relates to a mold-releasing agent. More particularly, the present invention relates to a mold-releasing agent having excellent film-forming properties and mold releasability.

BACKGROUND ART

Currently, silicone oil, wax, talc, mica, tetrafluoroethylene resin, and other mold-releasing agents are used in the molding of polymeric materials, such as plastic materials and rubber materials, using molds. Although silicone oil, wax, etc., have excellent mold releasability, such mold-releasing agents are transferred to molded products, thereby impairing uniform coating properties, secondary processability, and other properties; in addition, durability is not sufficient. As for tetrafluoroethylene resin, the durability of mold release effect and secondary processability are satisfactory; however, it is necessary to perform bake treatment to form a film on the molding surface of a mold in the mold-release process, and the same treatment is required for reprocessing. Consequently, many processes are required.

In order to solve these defects, mold-releasing agents comprising a $C_4$-$C_{20}$ polyfluoroalkyl group-containing phosphate ester as one of their active ingredients are proposed (see Patent Documents 1 to 3). These mold-releasing agents exhibit excellent mold releasability and have a longer mold release life than conventional mold-releasing agents; however, due to the recent trend toward the more complicated shape of molded products, there is a demand for mold-releasing agents having much higher performance.

Meanwhile, polyfluoroalkyl phosphonates are also widely used as starting materials for the synthesis of mold-releasing agents. Compounds having a $C_8$-$C_{12}$ perfluoroalkyl group are most likely to develop mold release performance when used as mold-releasing agents. In particular, phosphonate compounds having a $C_8$ perfluorooctyl group and represented by the general formula:

$$CF_3(CF_2)_7CH_2CH_2P(O)(OC_2H_5)_2$$

are preferably used for this kind of application (see Patent Documents 4 to 7).

Incidentally, it is reported that phosphate or phosphonate compounds having a $C_8$-$C_{12}$ perfluoroalkyl group are biologically degraded in the environment and converted to compounds having relatively high bioaccumulation and environmental concentration, causing concerns for exposure during treatment processes, and for release or diffusion from waste, treated substrates, etc., into the environment. Moreover, compounds having a perfluoroalkyl group containing 14 or more carbon atoms are very difficult to handle because of their physical and chemical properties, and hence, such compounds are rarely used in practice.

Furthermore, as for phosphate or phosphonate compounds having a perfluoroalkyl group containing 8 or more carbon atoms, generation and mixing of perfluorooctanoic acids with high bioaccumulation potential is unavoidable during the production of these compounds. For these reasons, companies that produce such phosphate or phosphonate compounds have retreated from the production of the compounds or promoted the use of alternative compounds having a perfluoroalkyl group containing 6 or less carbon atoms.

However, compounds having a perfluoroalkyl group containing 6 or less carbon atoms cause a significant decrease in orientation on the surface of a treated substrate, and the melting point, glass transition point (Tg), etc., of the compounds are markedly lower than those of $C_8$ compounds. Accordingly, the compounds are highly influenced by their environmental conditions, such as temperature, humidity, stress, and contact with organic solvents. Consequently, the desired performance cannot be sufficiently achieved, and durability and other properties are affected.

PRIOR ART DOCUMENT

Patent Document

Patent Document 1: JP-B-53-23270
Patent Document 2: JP-B-53-23271
Patent Document 3: JP-B-57-48035
Patent Document 4: JP-B-2-45572
Patent Document 5: JP-B-3-78244
Patent Document 6: JP-B-4-4923
Patent Document 7: JP-B-4-11366
Patent Document 8: WO 2007/105633 A1

OUTLINE OF THE INVENTION

Problem to be Solved by the Invention

An object of the present invention is to provide a mold-releasing agent comprising, as an active ingredient, a compound having a perfluoroalkyl group containing 6 or less carbon atoms, which is said to have low bioaccumulation potential, and having mold release performance equivalent to or more than that of a mold-releasing agent comprising a compound having a perfluoroalkyl group containing 8 or more carbon atoms as an active ingredient.

Means for Solving the Problem

The above object of the present invention can be accomplished by a mold-releasing agent comprising, as active ingredients:

a graft copolymer (A) in which a polyalkylene glycol or an alkyl ether thereof is graft-copolymerized with a polyfluoro-1-alkene represented by the general formula:

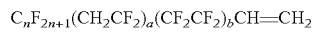

$$C_nF_{2n+1}(CH_2CF_2)_a(CF_2CF_2)_bCH=CH_2$$

wherein n is an integer of 1 to 6, a is an integer of 1 to 4, and b is an integer of 1 to 3; and a polyfluoroalkylphosphonic acid represented by the general formula:

$$C_nF_{2n+1}(CH_2CF_2)_a(CF_2CF_2)_b(CH_2CH_2)_cP(O)(OH)_2$$

wherein n is an integer of 1 to 6, a is an integer of 1 to 4, and b is an integer of 1 to 3, and c is an integer of 1 to 3, or a salt thereof (B).

Effect of the Invention

When released each components into the environment, the polyalkylene glycol (or alkyl ether)-polyfluoro-1-alkene graft copolymer (A) as one active ingredient of the present mold-releasing agent and the polyfluoroalkylphosphonic acid or salt thereof (B) as another component of the present mold-releasing agent undergo HF-elimination in the —CH$_2$CF$_2$— bonding site of the molecule, and a double bond is formed. The result is then subjected to ozone decomposition etc. to have a structure that is easily decomposed into a compound with low environmental concentration and low bioaccumulation potential. Moreover, the graft copolymer does not produce environmental loading substances (e.g., perfluoroalkyl carboxylic acids having 8 or more carbon atoms) in the production process thereof. Furthermore, the graft copolymer exhibits mold release performance equivalent to that of a mold-releasing agent comprising a compound having a perfluoroalkyl group containing 8 or more carbon atoms.

Such a graft copolymer and a polyfluoroalkylphosphonic acid (salt) exhibit effective mold release performance, for example, when it is applied as an aqueous or organic solvent type mold-releasing agent having a concentration of about 0.1 wt. % or less to an object to be subjected to a mold release treatment (e.g., a forming mold). This excellent effect is attributable to the extremely high solubility of the graft copolymer and the polyfluoroalkylphosphonic acid (salt), respectively, in solvents. Mold-releasing agents whose mold releasability is much more excellent than that of conventional mold-releasing agents, which are prepared to have solid matters content of 0.5 wt. %, can be obtained at solid matters content of about 0.1 wt. % or less.

Moreover, the excellent solubility of the graft copolymer and the polyfluoroalkylphosphonic acid (salt), respectively, in solvents facilitates the formation of mold-releasing agent solutions with uniform concentration. Accordingly, precipitation problematically formed in conventional mold-releasing agents does not occur, and good storage stability is ensured.

Owing to the above-described various properties of the graft copolymer and polyfluoroalkylphosphonic acid (salt), the mold-releasing agent of the present invention exhibits the following excellent effects:

(1) Tight adhesion to the mold surface due to the film-forming properties of the mold-releasing agent for the mold surface is excellent, significantly improving mold releasability and mold release life. This effect can be enhanced by using the graft copolymer and the polyfluoroalkylphosphonic acid (salt) in combination.

(2) Film-forming properties are excellent, allowing the formation of uniform coating on molded products of a complicated shape.

(3) Mold releasability and durability are excellent even after dilution to low concentration (e.g., about 0.1 wt. %), reducing mold contamination caused by the mold-releasing agent.

(4) Since the transmission of the mold-releasing agent to the molded product is low, the quality of the molded product after molding is less adversely affected, improving the dimensional accuracy of the molded product.

(5) The molded product does not lead to electrical contact failures, and has excellent secondary processability.

EMBODIMENTS FOR CARRYING OUT THE INVENTION

As the polyalkylene glycol or an alkyl ether thereof, which is to be the trunk polymer of the graft copolymer (A) as one component of the present mold-releasing agent, a compound represented by the general formula:

$$R^1O-(RO)_{p+q}-R^2$$

RO: a C$_2$-C$_6$ linear or branched oxyalkylene group
R$^1$, R$^2$: each independently a hydrogen atom, a C$_1$-C$_{20}$ alkyl group, or an aralkyl group
p+q: the polymerization number of oxyalkylene groups (1 to 50) is used.

Specific examples thereof include polyethylene glycols, polypropylene glycols, polybutylene glycols, polyhexylene glycols, or their monoalkyl ethers, dialkyl ethers, etc., which have a number average molecular weight (Mn) of about 200 to 4,000.

On the other hand, the polyfluoro-1-alkene represented by the general formula:

$$C_nF_{2n+1}(CH_2CF_2)_a(CF_2CF_2)_bCH=CH_2 \quad [I]$$

which is to be graft-copolymerized with such a polyalkylene glycol (or alkyl ether) is produced as a product [I] by reacting a polyfluoroalkyl iodide represented by the general formula:

$$C_nF_{2n+1}(CH_2CF_2)_a(CF_2CF_2)_b(CH_2CH_2)I \quad [II]$$

with a basic compound to carry out a terminal HI-elimination reaction.

The HI-elimination reaction at position 1 is carried out by reacting the polyfluoroalkyl iodide [II] with an inorganic basic compound in the presence of a phase transfer catalyst, or by reacting the polyfluoroalkyl iodide [II] with a nitrogen-containing organic basic compound. The former method is preferably used, so that a polyfluoro-1-alkene having a purity as high as 99% is obtained with high yield. In this case, it is essential to use a phase transfer catalyst in combination with an inorganic basic compound. When no phase transfer catalyst is used, the HI-elimination reaction can hardly proceed.

Examples of inorganic basic compounds include lithium hydroxide, sodium hydroxide, potassium hydroxide, magnesium hydroxide, calcium hydroxide, and other monovalent or divalent metal hydroxides; sodium carbonate, sodium hydrogen carbonate, potassium carbonate, potassium hydrogen carbonate, and other monovalent or divalent metal carbonates; and the like. As a phase transfer catalyst to be used in combination with such an inorganic basic compound, a quaternary onium salt, such as a quaternary ammonium salt or quaternary phosphonium salt, or Crown ether, is used at a ratio of about 0.01 to 10 mol %, preferably about 0.1 to 3 mol %, based on the inorganic basic compound.

Examples of nitrogen-containing organic basic compounds include diethylamine, triethylamine, pyridine or derivatives thereof, diethanolamine, triethanolamine, 1,8-diazabicyclo[5.4.0]-7-undecene, diazabicyclononene, and the like. Preferably, 1,8-diazabicyclo[5.4.0]-7-undecene having low nucleophilicity is used.

When a nitrogen-containing organic basic compound is used, a large amount of polyfluoroalkadiene mixture is produced as a by-product, in addition to the target polyfluoro-1-alkene; however, the polyfluoro-1-alkene and the polyfluoroalkadiene mixture can be separated by fractional distillation based on the difference in vapor temperature during distillation under reduced pressure.

Such an inorganic or organic basic compound is used in a molar ratio of about 0.1 to 10, preferably 0.95 to 2.5, more preferably 1.0 to 1.5, based on the polyfluoroalkane iodide [II]. When the amount of basic compound is less than this range, the desired HI-elimination reaction does not proceed smoothly; whereas when the amount of basic compound is more than this range, the removal of the basic compound becomes difficult, and side reactions occur, resulting in an increased amount of waste.

Although the HI-elimination reaction can be carried out in the absence of a solvent, the reaction is preferably carried out in the presence of an aqueous solvent or an organic solvent in terms of reaction efficiency and control of heating generation. Generally, water is used as an aqueous solvent. Examples of organic solvents include alcohols, such as methanol, ethanol, propanol, and isopropanol; ethers, such as diethyl ether, 1,4-dioxane, and tetrahydrofuran; ketones, such as acetone, methyl ethyl ketone, and methyl isobutyl ketone; hydrocarbons, such as toluene and cyclohexane; aprotic polar solvents, such as acetonitrile, N,N-dimethylformamide, N,N-diethylformamide, N,N-dimethylacetamide, N,N-diethylacetamide, and N-methyl-2-pyrrolidone; and fluorine-containing organic solvents, such as hydrochlorofluorocarbon (e.g., HCFC-225) and hydrofluoroether (e.g., Novec HFE, manufactured by 3M).

An aqueous solvent or an organic solvent is used in a volume ratio of about 0.1 to 100, preferably about 1 to 10, more preferably 3 to 6, based on the polyfluoroalkane iodide [II]. However, a larger amount of solvent does not affect the reaction efficiency, and thus the solvent is preferably used in a volume ratio of 3 to 6.

The HI-elimination reaction is carried out at about −20 to 100° C., preferably about −10 to 80° C. At temperatures higher than this range, side reactions proceed, generating a large amount of by-products with an unknown structure. The reaction may be carried out under reduced pressure, atmospheric pressure, or increased pressure; in terms of ease of handling the reaction apparatus, the reaction is preferably carried out under atmospheric pressure.

In a case where static phase separation is performed after the reaction is completed, the separated organic layer is washed with water, for example, to remove the basic compound, and purification is then performed by distillation etc., according to a standard method, thereby obtaining the target polyfluoro-1-alkene. For example, in a case where a polar solvent is used instead of performing static phase separation, the solvent is distilled off under reduced pressure, followed by the same treatment as in the case where static phase separation is carried out.

The polyfluoroalkyl iodide [II] is obtained by the addition reaction of terminally iodized polyfluoroalkane with ethylene. Examples of terminally iodized polyfluoroalkane include the following compounds:

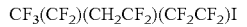

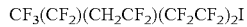

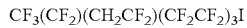

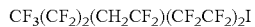

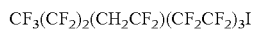

The polyfluoroalkyl iodide [II] can be produced by the addition reaction of a terminally iodized compound represented by the general formula: $C_nF_{2n+1}(CH_2CF_2)_a(CF_2CF_2)_bI$ [A] with ethylene. The ethylene addition reaction is carried out in such a manner that the compound [A] above is subjected to an addition reaction with pressurized ethylene in the presence of a peroxide initiator. The number of addition is 1 or more, preferably 1, although depending on the reaction conditions. Although the reaction temperature depends on the degradation temperature of the initiator used, the reaction is generally conducted at about 80 to 120° C.; when a peroxide initiator that decomposes at a low temperature is used, the reaction can be conducted at 80° C. or below. As a peroxide initiator, tert-butyl peroxide, di(tert-butylcyclohexyl) peroxydicarbonate, dicetyl peroxydicarbonate, or the like may be used at a ratio of about 1 to 5 mol %, based on the compound [A].

The polyfluoroalkane iodide [II] is reacted with a basic compound to carry out dehydrohalogenation, thereby resulting in an HI-elimination reaction at position 1. Thus, the polyfluoro-1-alkene [I] is produced, as described above.

The graft copolymerization of the polyfluoro-1-alkene [I] with the polyalkylene glycol or its alkyl ether trunk polymer is carried out so that the F content derived from the polyfluoro-1-alkene [I] is about 3 to 70 wt. %, preferably about 5 to 45 wt. %, in the obtained graft copolymer, in terms of solvent solubility and mold release performance. Generally, the polyfluoro-1-alkene [I] is used at a feed molar ratio of 1.0 to 20, preferably 1.0 to 5.0, based on the polyalkylene glycol (alkyl ether).

The graft copolymerization between the both is carried out by heating to a temperature of about 80 to 180° C. optionally in the presence of a solvent (e.g., benzene), using generally used peroxide- or azo-based radical initiators. As a result, a graft copolymer in which the polyfluoro-1-alkene is presumably graft-copolymerized with the alkylene glycol group at one end can be obtained.

When a compound of the general formula:

is used as the polyalkylene glycol (or alkyl ether), the resulting product is represented by the general formula:

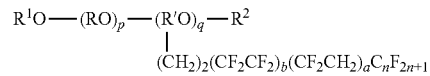

wherein p is the number of oxyalkylene groups that are not graft-copolymerized, q is the number of oxyalkylene groups that are graft-copolymerized, and p+q is generally 1 to 50, preferably 10 to 50.

The polyfluoroalkylphosphonic acid (B) as another component of the mold-releasing agent is produced by a hydrolysis reaction of a polyfluoroalkylphosphonic acid diester represented by the general formula:

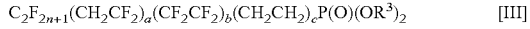     [III]

wherein $R^3$ is a $C_1$-$C_4$ alkyl group, n is an integer of 1 to 6, a is an integer of 1 to 4, b is an integer of 1 to 3, and c is an integer of 1 to 3.

The polyfluoroalkylphosphonic acid diester [III], which is used as a starting material for this reaction, is obtained by the reaction of a polyfluoroalkyl iodide [II'] of the general formula:

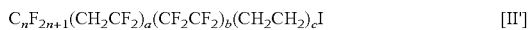     [II']

with trialkyl phosphite $P(OR^3)_3$. The polyfluoroalkyl iodide [II'] is a known compound that is a polyfluoroalkyl iodide of the general formula [II] above wherein the number c of added ethylenes is 1 to 3, and is disclosed in Patent Document 8.

The polyfluoroalkyl iodide [II'] prepared by the ethylene addition reaction can be reacted with trialkyl phosphite $P(OR^3)_3$ having an $C_1$-$C_4$ alkyl group, such as trimethyl phosphite, triethyl phosphite, tripropyl phosphite, or tributyl phosphite, to perform the RI-elimination reaction, thereby obtaining a polyfluoroalkylphosphonic acid diester [III], which is used as a starting material of the polyfluoroalkylphosphonic acid. Without the addition reaction of the compound [II'] with ethylene, the RI-elimination reaction with trialkyl phosphite does not proceed.

The hydrolysis reaction of the polyfluoroalkylphosphonic acid diester [III] can be readily carried out by stirring at about 90 to 100° C. in the presence of an acidic catalyst, such as inorganic acid typified by concentrated hydrochloric acid. The resulting reaction mixture is filtered under reduced pressure, followed by water washing•filtration, acetone washing•filtration, and other methods, thereby obtaining the target compound polyfluoroalkylphosphonic acid [I] with a good yield of 90% or more.

The obtained polyfluoroalkylphosphonic acid can be used in the form of a salt after neutralization. The salt can be generally formed by titration with a salt-forming reactant, such as sodium hydroxide, ammonium hydroxide, zinc sulfate, zinc acetate, zinc oxide, triethylamine, morpholine, triethanolamine, or tris(2-hydroxyethyl), while identifying the equivalence point by the pH, to form an acidic mono-, di- or trivalent metal salt, amine salt, or ammonium salt. Examples of polyfluoroalkylphosphonic acid salts thus obtained include sodium, potassium, lithium, barium, magnesium, calcium, zinc, and other metal salts of polyfluoroalkylphosphonic acids; ammonium salts of polyfluoroalkylphosphonic acids; ammonium salts of polyfluoroalkylphosphonic acids substituted by alkyl or cycloalkyl groups, such as monoethyl, monoisopropyl, diethyl, dicyclohexyl, and triethyl; ammonium salts of polyfluoroalkylphosphonic acids substituted by hydroxyalkyl groups, such as monoethanol, diethanol, triethanol, and diisopropanol; and the like.

The formation of a salt of the polyfluoroalkylphosphonic acid is particularly effective for improving mold release performance, enhancing mold releasability and mold release life. A neutralizing agent used for the salt formation is used in an amount sufficient for the neutralization of the $(OH)_2$ group of the polyfluoroalkylphosphonic acid. For example, when the neutralizing agent is triethylamine, it is used at a weight ratio of about 0.1 to 0.7 based on the polyfluoroalkylphosphonic acid.

The proportion of the graft copolymer (A), in which a polyalkylene glycol (alkyl ether) is graft-copolymerized with a polyfluoro-1-alkene, and the polyfluoroalkylphosphonic acid or a salt thereof (B) is such that the ratio of the component (A) in the total amount of the both components (A) and (B) is about 90 to 5 wt. %, preferably about 80 to 10 wt. %, while the ratio of the component (B) is about 10 to 95 wt. %, preferably about 20 to 90 wt. %. When the ratio of the component (B) is greater than this range, the effect of improving mold release performance due to the synergistic effect of both components cannot be obtained; whereas when the ratio of the component (B) is less than this range, the desired effect of improving mold release performance cannot also be obtained.

The graft copolymer (A) and the polyfluoroalkylphosphonic acid or salt thereof (B) as active ingredients of the mold-releasing agent are used as a mold-releasing agent in the form of a solution or dispersion of water, an aqueous medium, or an organic medium. Examples of organic media include aromatic hydrocarbons, such as xylene and toluene; alcohols, such as methanol, ethanol, and isopropanol; ketones, such as acetone and methyl ethyl ketone; esters, such as ethyl acetate and butyl acetate; halogenated hydrocarbons, such as methyl chloroform, xylene hexafluoride, and 1,1,2-trichloro-1,2,2-trifluoroethane; and the like. Using such an organic medium, a mold-releasing agent is prepared as total solid matters concentration of about 0.01 to 30 wt. %, preferably about 0.05 to 3 wt. %. Moreover, when water or an aqueous medium in which water is mixed with water-soluble organic solvents, such as alcohols and ketones, is used, a mold-releasing agent is prepared as an aqueous solution or dispersion in which the graft copolymer is dispersed at the same concentration.

The mold-releasing agent comprising the graft copolymer (A) and the polyfluoroalkylphosphonic acid or salt thereof (B) as active ingredients, which is prepared as a solution or dispersion of water, an aqueous medium, or an organic medium, as described above, can be applied to a mold surface by spray coating, brushing, immersing, or other method. In addition, the mold-releasing agent can also be applied to materials other than the mold surface. For example, when the mold-releasing agent is applied to a rubber compound surface, adhesion of the compound can be effectively prevented.

EXAMPLES

The following describes the present invention with reference to Examples.

Reference Example 1

(1) In a 1,200-ml autoclave equipped with a stirrer and a thermometer, 603 g (0.99 mol) of a compound of the formula:

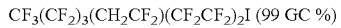
$CF_3(CF_2)_3(CH_2CF_2)(CF_2CF_2)_2I$ (99 GC %)

and 7 g of di-tert-butyl peroxide were charged, and the autoclave was degassed by a vacuum pump. After the internal temperature was raised to 80° C. by heating, ethylene was sequentially introduced so that the internal pressure was 0.5 MPa. When the internal pressure dropped to 0.2 MPa, ethylene was introduced again to return the pressure to 0.5 MPa; this operation was repeated. While maintaining the internal temperature at 80 to 115° C., 41 g (1.45 mol) of ethylene was introduced over about 3 hours. The content was collected at an internal temperature of 50° C. or less, thereby obtaining 637 g (yield: 98.8%) of a compound of the formula:

$CF_3(CF_2)_3(CH_2CF_2)(CF_2CF_2)_2(CH_2CH_2)I$ (98 GC %), i.e., the general formula:

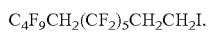
$C_4F_9CH_2(CF_2)_5CH_2CH_2I$.

(2) In a 50-ml glass reactor equipped with a cooling condenser, a thermocouple, and a magnet stirrer, 5 g (7.8 mmol) of 3,3,4,4,5,5,6,6,7,7,9,9,10,10,11,11,12,12,12-nonadecafluoro-1-iodododecane of the formula: $C_4F_9CH_2(CF_2)_5$ $CH_2CH_2I$ obtained in step (1) above was suspended in an aqueous solution in which 0.34 g (8.5 mmol) of sodium hydroxide and 0.03 g (0.13 mmol) of tetrabutylammonium chloride were dissolved in 15 ml of water. The mixture was reacted by continuous stirring for about 72 hours at room temperature.

After the reaction was completed, the lower layer obtained by static phase separation was washed twice with 20 ml of water and then once with a saturated saline solution. The obtained reaction product solution was dehydrated and dried over anhydrous magnesium sulfate. The recovered solution was purified by distillation under reduced pressure, thereby obtaining 3.2 g (yield: 83%) of a product, i.e., polyfluoro-1-alkene A, as a fraction with a vapor temperature of 76 to 77° C./1 kPa (purity: 99%). The structure of the obtained fraction was determined by $^1$H-NMR and $^{19}$F-NMR.

Product A: 3,3,4,4,5,5,6,6,7,7,9,9,10,10,11,11,12,12,12-nonadecafluoro-1-dodecene
CF$_3$CF$_2$CF$_2$CF$_2$CH$_2$CF$_2$CF$_2$CF$_2$CF$_2$CH=CH$_2$ $^1$H-NMR; δ=2.90 (2H: —C$\underline{H}_2$—), 5.79 (1H: —CF$_2$—C$\underline{H}$=), 5.97 (2H: =C$\underline{H}_2$)

$^{19}$F-NMR; δ=−82.02 (3F: C$\underline{F}_3$-), −113.04 (4F: —C$\underline{F}_2$CH$_2$—), −114.79 (2F: —C$\underline{F}_2$CH=), −121.9 to −128.2 (10$\underline{F}$: —C$\underline{F}_2$—)

(3) In a 300-ml reactor equipped with a stirrer, a reflux device, and a thermometer, 200 g (0.10 mol) of polyethylene glycol monomethyl ether (Mn: 2,012, p+q: about 45, melting point: 48° C.) was charged. After the temperature was raised to 70° C., the air in the reactor was replaced by nitrogen gas for 30 minutes. Thereafter, the temperature was raised to 145° C., and 1.25 g of di-tert-butyl peroxide was added, followed by stirring for 5 minutes. Then, 56 g (0.11 mol) of polyfluoro-1-alkene A was added dropwise over 2 hours, and the mixture was reacted at that temperature for 24 hours.

After the reaction was completed, unreacted polyfluoro-1-alkene A, initiator decomposition products, etc., were distilled off under reduced pressure, thereby obtaining 235 g (yield: 92%) of light yellow, wax-state graft copolymer I. The structure of the obtained copolymer I was determined by $^1$H-NMR and $^{19}$F-NMR.

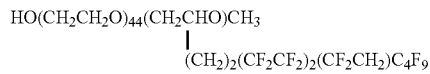

$^1$H-NMR; δ=1.74 (2H: —CF$_2$C$\underline{H}_2$CH$_2$—), 2.25 (2H: —CF$_2$CH$_2$C$\underline{H}_2$—), 2.9 (2H: —C$\underline{F}_2$CH$_2$CF$_2$—), 3.25 (3H: —OC$\underline{H}_3$), 3.2 to 3.7 (179H: —OC$\underline{H}_2$C$\underline{H}_2$O—, —OC$\underline{H}_2$CH—)

$^{19}$F-$\overline{\text{NMR}}$; δ=−82.0 (3F: C$\underline{F}_3$—), −113.1 (4F: —C$\underline{F}_2$CH$_2$CF$_2$—), −114.5 (2F: —CF$_2$C$\underline{F}_2$CH$_2$CH$_2$—), −121.9 to −127.0 ($\overline{10F}$: —C$\underline{F}_2$—)

| Starting material | Polyfluoro-1-alkene | Abbrev. |
|---|---|---|
| CF$_3$(CF$_2$)$_3$CH$_2$(CF$_2$)$_5$(CH$_2$)$_2$I | CF$_3$(CF$_2$)$_3$CH$_2$(CF$_2$)$_5$CH=CH$_2$ | A |
| CF$_3$(CF$_2$)$_3$CH$_2$(CF$_2$)$_3$(CH$_2$)$_2$I | CF$_3$(CF$_2$)$_3$CH$_2$(CF$_2$)$_3$CH=CH$_2$ | B |
| CF$_3$CF$_2$CH$_2$(CF$_2$)$_7$(CH$_2$)$_2$I | CF$_3$CF$_2$CH$_2$(CF$_2$)$_7$CH=CH$_2$ | C |
| CF$_3$CF$_2$CH$_2$(CF$_2$)$_5$(CH$_2$)$_2$I | CF$_3$CF$_2$CH$_2$(CF$_2$)$_5$CH=CH$_2$ | D |
| CF$_3$CF$_2$CH$_2$(CF$_2$)$_3$(CH$_2$)$_2$I | CF$_3$CF$_2$CH$_2$(CF$_2$)$_3$CH=CH$_2$ | E |

(2) In Reference Example 1 (3), the type and amount of polyalkylene glycol-based compound [PAG] were changed in various ways, and the type and amount of polyfluoro-1-alkene [PFA] were also changed in various ways, thereby obtaining graft copolymers II to VII.

Polyalkylene glycol-based compound [PAG]: R$^1$O—(RO)$_{p+q}$—R$^2$ a: HO(CH$_2$CH$_2$O)$_{p+q}$CH$_3$ p+q: about 45
b: HO(CH$_2$CH$_2$O)$_{p+q}$CH$_3$ p+q: about 20
c: HO(CH$_2$CH$_2$O)$_{p+q}$H p+q: about 20
d: CH$_3$—O—(CH$_2$CH$_2$O)$_{p+q}$CH$_3$ p+q: about 45
e: HO[CH$_2$CH(CH$_3$)O]$_{p+q}$CH$_3$ p+q: about 14
f: HO[CH$_2$CH(CH$_3$)O]$_{p+q}$(CH$_2$)$_3$CH$_3$ p+q: about 14

Table 1 below shows the obtained results, including the results of Reference Example 1. The produced graft copolymers are represented by the following general formula. The number q of graft-copolymerized oxyalkylene groups was determined by $^1$H-NMR.

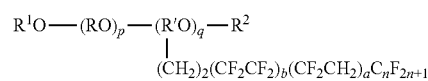

RO: an oxyalkylene group
R'O: an oxyalkylene group from which one hydrogen atom was removed for graft copolymerization

TABLE 1

|  | Graft copolymer | | | | | | |
|---|---|---|---|---|---|---|---|
|  | I | II | III | IV | V | VI | VII |
| [PAG] | | | | | | | |
| Type | a | b | a | c | d | e | f |
| Amount (g) | 200 | 90 | 200 | 88 | 200 | 83 | 87 |
| Amount (mol) | 0.10 | 0.10 | 0.10 | 0.10 | 0.10 | 0.10 | 0.10 |
| [PFA] | | | | | | | |
| Type | A | B | E | C | A | D | A |
| Amount (g) | 56 | 90 | 34 | 168 | 56 | 90 | 112 |
| Amount (mol) | 0.11 | 0.22 | 0.11 | 0.33 | 0.11 | 0.22 | 0.22 |
| [Product] | | | | | | | |
| p | 44 | 18 | 44 | 17 | 44 | 12 | 12 |
| q | 1 | 2 | 1 | 3 | 1 | 2 | 2 |
| Recovered amount (%) | 235 | 165 | 225 | 238 | 247 | 160 | 180 |
| Yield (%) | 92 | 92 | 96 | 93 | 96 | 92 | 90 |
| F content (%) | 15 | 34 | 9 | 45 | 14 | 35 | 40 |

Reference Example 2

(1) In Reference Example 1, the starting material (polyfluoro-1-iodoalkane) was changed to various compounds, thereby obtaining corresponding products, i.e., polyfluoro-1-alkenes B to E. The polyfluoro-1-alkene A is also shown below.

Reference Example 3

(1) In a 1-L capacity, four-necked flask equipped with a thermometer and a receiver for removing low-boiling substances, 500 g (0.78 mol) of a compound of the formula: CF$_3$(CF$_2$)$_3$(CH$_2$CF$_2$)(CF$_2$CF$_2$)$_2$(CH$_2$CH$_2$)I (99 GC %), and 181 g (1.56 mol) of triethyl phosphite P(OC$_2$H$_5$)$_3$ were charged, and the mixture was stirred at 155° C. At this time, to remove the by-product, i.e., ethyl iodide, from the reaction system, nitrogen gas was bubbled into the reaction solution using a slender tube. A slight amount of reaction solution was taken and subjected to gas chromatography analysis to confirm the remaining amount of triethyl phosphite. Thereafter, triethyl phosphite was further added in four batches in an amount of 91 g (0.78 mol) per batch, and the mixture was stirred for 18 hours in total.

After the reaction was completed, the reaction mixture was subjected to simple distillation under reduced pressure at an internal pressure of 0.2 kPa, an internal temperature of 160 to 170° C., and an overhead temperature of 150 to 155° C. The distillate fraction was washed with water, thereby obtaining 412 g (yield 78%) of a purified reaction product (96 GC %).

The results of $^1$H-NMR and $^{19}$F-NMR confirmed that the resulting purified reaction product was a compound represented by the following formula:

$$CF_3(CF_2)_3(CH_2CF_2)(CF_2CF_2)_2(CH_2CH_2)P(O)(OCH_2CH_3)_2$$

(2) In a 1-L capacity, four-necked flask equipped with a thermometer and a condenser, 300 g (0.44 mol) of the polyfluoroalkylphosphonic acid diester of the formula: $CF_3(CF_2)_3(CH_2CF_2)(CF_2CF_2)_2(CH_2CH_2)P(O)(OCH_2CH_3)_2$ (96 GC %) obtained in step (1) above, and 300 g of about 35% concentrated hydrochloric acid were charged, and the mixture was stirred at 100° C. for 12 hours. After cooling, filtration under reduced pressure was performed to thereby collect 276 g of solid matters. The solid matters were washed with water and filtrated again, further followed by acetone washing and filtration, thereby obtaining 242 g (0.41 mol; yield 92%) of the target product.

The results of $^1$H-NMR and $^{19}$F-NMR confirmed that the resulting reaction product was the target compound (polyfluoroalkylphosphonic acid A) represented by the following formula:

$$CF_3(CF_2)_3(CH_2CF_2)(CF_2CF_2)_2(CH_2CH_2)P(O)(OH)_2$$

Reference Example 4

(1) In a 1-L, four-necked flask equipped with a thermometer and a receiver for removing low-boiling substances, 500 g (0.92 mol) of a compound of the formula:

$$CF_3(CF_2)_3(CH_2CF_2)(CF_2CF_2)(CH_2CH_2)I \text{ (99 GC \%)}$$

and 213 g (1.84 mol) of triethyl phosphite $P(OC_2H_5)_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 107 g (0.92 mol) per batch, and the mixture was stirred for 18 hours in total.

After the reaction was completed, the reaction mixture was subjected to simple distillation under reduced pressure at an internal pressure of 0.2 kPa, an internal temperature of 145 to 155° C., and an overhead temperature of 138 to 142° C. The distillate fraction was washed with water, thereby obtaining 407 g (yield: 79%) of a purified reaction product (98 GC %).

The results of $^1$H-NMR and $^{19}$F-NMR confirmed that the resulting purified reaction product was a compound represented by the following formula:

$$CF_3(CF_2)_3(CH_2CF_2)(CF_2CF_2)(CH_2CH_2)P(O)(OCH_2CH_3)_2$$

(2) In a 1-L, four-necked flask equipped with a thermometer and a condenser, 300 g (0.53 mol) of the obtained phosphonic acid diester of the formula:

$$CF_3(CF_2)_3(CH_2CF_2)(CF_2CF_2)(CH_2CH_2)P(O)(OCH_2CH_3)_2 \text{ (96 GC \%)}$$

and 300 g of about 35% concentrated hydrochloric acid were charged, and the mixture was stirred at 100° C. for 12 hours. After cooling, filtration under reduced pressure was performed to thereby collect 287 g of solid matters. The solid matters were washed with water and filtrated again, further followed by acetone washing and filtration, thereby obtaining 240 g (0.49 mol; yield: 93%) of the target product.

The results of $^1$H-NMR and $^{19}$F-NMR confirmed that the resulting product was the target compound (polyfluoroalkylphosphonic acid B) represented by the following formula:

$$CF_3(CF_2)_3(CH_2CF_2)(CF_2CF_2)(CH_2CH_2)P(O)(OH)_2$$

Example 1

The above-mentioned graft copolymer I (0.3 parts by weight), polyfluoroalkylphosphonic acid A (0.2 parts by weight) obtained in Reference Example 3 and triethylamine [TEA] (0.1 parts by weight) were added to 99.4 parts by weight of ion-exchanged water to prepare a mold-releasing agent aqueous solution. Using the mold-releasing agent aqueous solution, mold releasability was evaluated by the following two measurement methods. The results were such that mold releasability was 0.1 N, and mold release life was 25 times.

<Evaluation of Mold Releasability and Mold Release Life>

Polyurethane prepolymer (100 parts by weight; Coronate C-4090, manufactured by Nippon Polyurethane Industry Co., Ltd.), which had been heated to 80° C., and 12.8 parts by weight of methylene-bis-o-chloroaniline curing agent (Iharacuamine MT, manufactured by Ihara Chemical Industry Co., Ltd.), which had been heat-melted, were mixed by stirring without forming air bubbles. The mixture was poured into an aluminum mold (diameter: 45 mm, depth: 50 mm) to which the above mold-releasing agent aqueous solution had been applied by spraying, and which had been preheated to 80° C. A hook was stood in the center of the space of the mold for removing the cured molded product. After heat-curing at 120° C. for 1 hour, the molded product was taken out from the mold by pulling the hook. The mold release load required to pull the hook was regarded as mold releasability. After the mold releasability was thus determined, mold release life was determined by measuring how many times a one-time application of the mold-releasing agent aqueous solution allowed mold releasing at a mold release load of 50 N or less.

Example 2

In Example 1, the amounts of the graft copolymer I, polyfluoroalkylphosphonic acid A, triethylamine, and ion-exchanged water were changed, respectively, to 0.1 part by weight, 0.4 parts by weight, 0.2 parts by weight, and 99.3 parts by weight.

Example 3

In Example 1, the same amount (0.2 parts by weight) of the polyfluoroalkylphosphonic acid B obtained in Reference Example 4 was used in place of the polyfluoroalkylphosphonic acid A; triethylamine was not used; and 85 parts by weight of ethanol and 14.5 parts by weight of isopropanol were used in place of ion-exchanged water.

Since polyfluoroalkylphosphonic acid is insoluble in water, the acid is neutralized with triethylamine etc., in the case of using in a water system, to make it soluble in water before use; however, it is soluble in an organic solvent system without neutralization.

Example 4

A mold-releasing agent aqueous solution comprising 0.3 parts by weight of the above-mentioned graft copolymer II, 0.2 parts by weight of the polyfluoroalkylphosphonic acid A, 0.1 part by weight of triethylamine, 85.0 parts by weight of ion-exchanged water, and 14.4 parts by weight of ethanol [EtOH] was prepared, and the mold releasability thereof was evaluated.

Comparative Examples 1 to 7

Each of the above-mentioned graft copolymers I to VII (0.5 parts by weight) was added to 99.5 parts by weight of ion-exchanged water, thereby preparing a mold-releasing agent aqueous solution, and the mold releasability thereof was evaluated.

Comparative Example 8

A mold-releasing agent aqueous solution comprising 0.5 parts by weight of the above-mentioned graft copolymer I, 85.0 parts by weight of ion-exchanged water, and 14.5 parts by weight of ethanol was prepared, and the mold releasability thereof was evaluated.

Comparative Example 9

A mold-releasing agent aqueous solution comprising 0.5 parts by weight of the polyfluoroalkylphosphonic acid A obtained in Reference Example 3, 0.2 parts by weight of triethylamine, and 99.3 parts by weight of ion-exchanged water was prepared, and the mold releasability thereof was evaluated.

Comparative Example 10

A mold-releasing agent aqueous solution comprising 0.5 parts by weight of the polyfluoroalkylphosphonic acid B obtained in Reference Example 4, 0.2 parts by weight of triethylamine, and 99.3 parts by weight of ion-exchanged water was prepared, and the mold releasability thereof was evaluated.

Comparative Example 11

A mold-releasing agent organic solvent solution comprising 0.5 parts by weight of the polyfluoroalkylphosphonic acid B, 85.0 parts by weight of ethanol, and 14.5 parts by weight of isopropanol [IPA] was prepared, and the mold releasability thereof was evaluated.

Table 2 below shows the evaluation results of mold releasability obtained in the Examples and Comparative Examples. The term "part" indicating the amount of each component means "part by weight".

TABLE 2

| Example | Copolymer Type | (Part) | Phosphonic acid Type | (Part) | TEA (Part) | Medium (part) Water | EtOH | IPA | Mold releasability (N) | Mold release life (time) |
|---|---|---|---|---|---|---|---|---|---|---|
| Ex. 1 | I | 0.3 | A | 0.2 | 0.1 | 99.4 | — | — | 0.1 | 25 |
| Ex. 2 | I | 0.1 | A | 0.4 | 0.2 | 99.3 | — | — | 0.1 | 23 |
| Ex. 3 | I | 0.3 | B | 0.2 | — | — | 85.0 | 14.5 | 0.2 | 19 |
| Ex. 4 | II | 0.3 | A | 0.2 | 0.1 | 85.0 | 14.4 | — | 0.1 | 25 |
| Comp. Ex. 1 | I | 0.5 | — | — | — | 99.5 | — | — | 6.0 | 10 |
| Comp. Ex. 2 | II | 0.5 | — | — | — | 99.5 | — | — | 5.0 | 15 |
| Comp. Ex. 3 | III | 0.5 | — | — | — | 99.5 | — | — | 10.0 | 7 |
| Comp. Ex. 4 | IV | 0.5 | — | — | — | 99.5 | — | — | 4.0 | 16 |
| Comp. Ex. 5 | V | 0.5 | — | — | — | 99.5 | — | — | 6.2 | 11 |
| Comp. Ex. 6 | VI | 0.5 | — | — | — | 99.5 | — | — | 5.2 | 14 |
| Comp. Ex. 7 | VII | 0.5 | — | — | — | 99.5 | — | — | 5.0 | 11 |
| Comp. Ex. 8 | I | 0.5 | — | — | — | 85.0 | 14.5 | — | 6.1 | 12 |
| Comp. Ex. 9 | — | — | A | 0.5 | 0.2 | 99.3 | — | — | 7.0 | 12 |
| Comp. Ex. 10 | — | — | B | 0.5 | 0.2 | 99.3 | — | — | 19.0 | 7 |
| Comp. Ex. 11 | — | — | B | 0.5 | — | — | 85.0 | 14.5 | 17.0 | 6 |

The invention claimed is:

1. A mold-releasing agent comprising, as active ingredients:
   a graft copolymer (A) in which a polyalkylene glycol or an alkyl ether thereof is graft-copolymerized with a polyfluoro-1-alkene represented by the general formula:

$$C_nF_{2n+1}(CH_2CF_2)_a(CF_2CF_2)_bCH=CH_2$$

wherein n is an integer of 1 to 6, a is an integer of 1 to 4, and b is an integer of 1 to 3; and
   a polyfluoroalkylphosphonic acid represented by the general formula:

$$C_nF_{2n+1}(CH_2CF_2)_a(CF_2CF_2)_b(CH_2CH_2)_cP(O)(OH)_2$$

wherein n is an integer of 1 to 6, a is an integer of 1 to 4, and b is an integer of 1 to 3, and c is an integer of 1 to 3, or a salt thereof (B).

2. The mold-releasing agent according to claim 1, wherein the graft copolymer (A) uses, as a trunk polymer, a polyalkylene glycol represented by the general formula:

wherein RO is a linear or branched oxyalkylene group having 2 to 6 carbon atoms, $R^1$ and $R^2$ are each independently a hydrogen atom, an alkyl group having 1 to 20 carbon atoms, or an aralkyl group, and p+q is the number of oxyalkylene groups and is an integer of 1 to 50, or an alkyl ether thereof; and produces a product represented by the general formula:

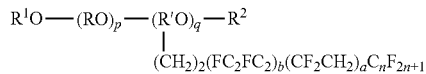

wherein RO, $R^1$, $R^2$, and n are as defined above, R'O is a graft-copolymerized oxyalkylene group, p is the number of oxyalkylene groups that are not graft-copolymerized, and g is the number of oxyalkylene groups that are graft-copolymerized.

3. The mold-releasing agent according to claim 1, wherein the graft copolymer (A) has a fluorine content of 3 to 70 wt. %.

4. The mold-releasing agent according to claim 1, wherein in the total amount of the both components (A) and (B), the ratio of the component (A) is 90 to 5 wt. %, and the ratio of the component (B) is 10 to 95 wt. %.

5. The mold-releasing agent according to claim 1, wherein in the total amount of the both components (A) and (B), the ratio of the component (A) is 80 to 10 wt. %, and the ratio of the component (B) is 20 to 90 wt. %.

6. The mold-releasing agent according to claim 1, which is prepared as a solution or dispersion of water, an aqueous medium, or an organic solvent.

7. The mold-releasing agent according to claim 6, wherein the total solid matters content of the both components (A) and (B) is 0.01 to 30 wt. %.

8. The mold-releasing agent according to claim 6, wherein the total solid matters content of the both components (A) and (B) is 0.05 to 3 wt. %.

9. The mold-releasing agent according to claim 6, which is applied to a forming mold for use.

* * * * *